United States Patent [19]

Brackbill et al.

[11] 4,187,988

[45] Feb. 12, 1980

[54] MANURE SPREADER PADDLE ATTACHMENT

[75] Inventors: Warren H. Brackbill, Paradise; Loren G. Sadler, Stevens, both of Pa.

[73] Assignee: Sperry Rand Corporation, New Holland, Pa.

[21] Appl. No.: 966,445

[22] Filed: Dec. 4, 1978

[51] Int. Cl.² ............................................. A01C 23/00
[52] U.S. Cl. ................................... 239/662; 239/679; 241/273.3; 241/291
[58] Field of Search ................. 239/662, 679, 680; 241/291, 273.3, 273.4

[56] References Cited

U.S. PATENT DOCUMENTS

| 1,669,693 | 5/1928 | Claar | 239/679 |
| 3,298,695 | 1/1967 | Brackbill et al. | 239/662 |
| 3,997,118 | 12/1976 | Bedwell et al. | 239/662 X |

*Primary Examiner*—John J. Love
*Attorney, Agent, or Firm*—Larry W. Miller; Frank A. Seemar; John B. Mitchell

[57] ABSTRACT

A manure spreader paddle attachment is disclosed wherein a flexible extension is attached to the trailing face of the manure spreader paddle. This extension covers the outer peripheral toothed edge of the paddle to provide a capability for the paddle to scoop up and discharge liquified material yet deflects when the paddle encounters tough pen-packed material to permit the teeth to engage, shred and discharge the more solidified material.

25 Claims, 6 Drawing Figures

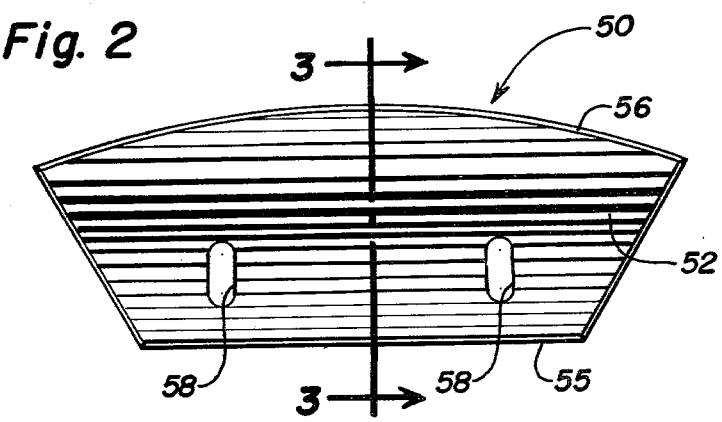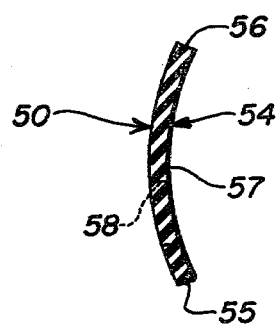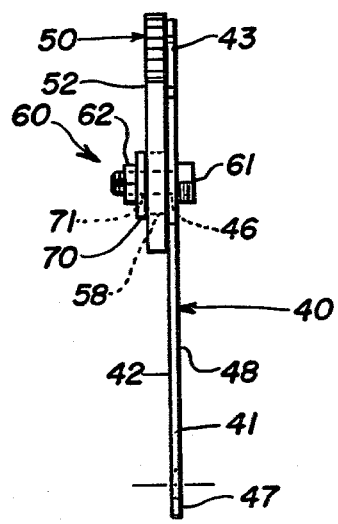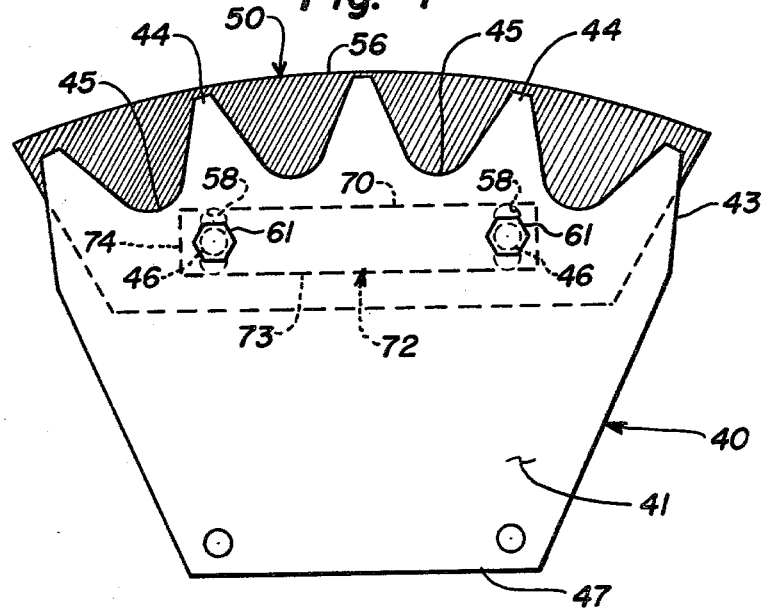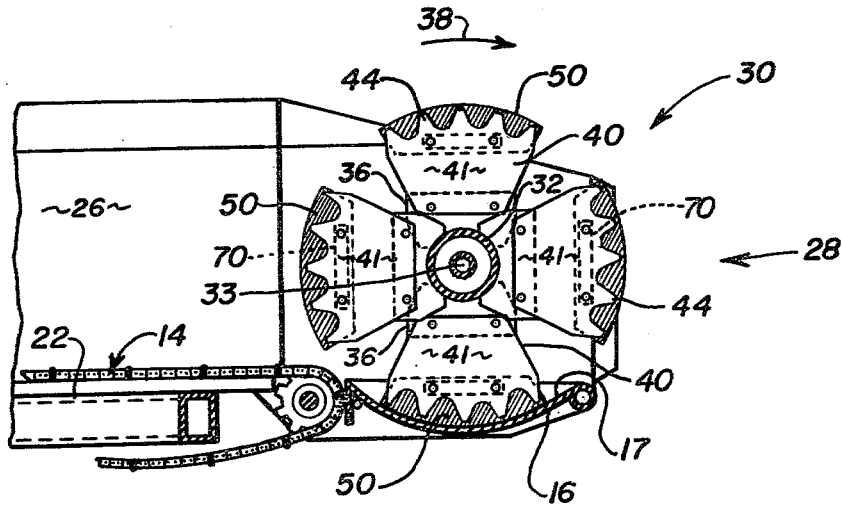

000

MANURE SPREADER PADDLE ATTACHMENT

BACKGROUND OF THE INVENTION

The present invention relates generally to manure spreaders and, more particularly, to a paddle attachment for improving the discharge capabilities of manure spreaders in discharging soupy material.

One type of manure spreader on the market today employs a single beater assembly located in the rear discharge area and has an array of flat saw toothed-like paddles mounted on a rotatable transverse shaft which, when rotated, engages, tears, shreds and scatters the material rearwardly of the spreader. Examples of the shape and configuration of such paddles can be found in U.S. Pat. No. 3,847,356 granted to Blanshine on Nov. 12, 1974 and in U.S. Pat. No. 3,228,701 granted to Smith et al. on Jan. 11, 1966. Generally, the paddles are mounted at an oblique angle to the axis of rotation so that the material is scattered to each side of the spreader as well as to the rear. Over the years, there have been various paddle designs directed toward improving not only the tearing and shredding characteristics of these paddles but also toward achieving a wide uniformly distributed spread pattern, such as in U.S. Pat. No. 3,295,855 granted to Sadler et al. on Jan. 3, 1967 and in U.S. Pat. No. 3,175,830 granted to Lepp on Mar. 30, 1965.

Such single type beater spreaders have proven to be economical over the multiple beater spreaders and perform quite satisfactory in pen-type manure, a more solidified manure characterized by a proportionally high amount of bedding material. However, due to increased costs of labor and bedding material, the modern trend in livestock operations is to use less bedding material resulting in manure being in a more soupy or sloppy state. This soupy manure has a higher moisture content and a less solidified consistency than pen-type manure.

Some livestock operators have tried their box type manure spreaders, normally used for pen-type manure, on this soupy material and are disappointed in that the present day paddles cannot effectively and efficiently discharge the more liquified material. The present day toothed paddle is not designed to rapidly scoop up this soupy material and merely combs through it. As a result, it requires more time to empty a given load of manure, and furthermore, the desired uniformity and the width of the spread pattern is not attained.

The "tank type" spreaders, which are common in the art today, were developed for handling the soupy type of manure. Although these tank type spreaders sufficiently handle this soupy material, they require more power to operate and are generally more expensive than a box type spreader of a comparable capacity. Moreover, these tank type spreaders are generally limited to the handling of soupy material and are not efficient in the handling of pen-type manure.

SUMMARY OF THE INVENTION

It is a feature of this invention to provide an attachment for spreader paddles which will deflect when tough material is encountered to allow the paddle teeth to engage and shred such material without utilizing excessive amounts of power.

It is another feature of this invention to provide the capability in a manure spreader paddle attachment for adjustment of the length relative to the paddle to eliminate the change in positional relationship due to wear at the end of the attachment.

It is still another feature of this invention to provide a flexible paddle attachment which has some resistance to deflecting forces but will still deflect when engaging tough pen-type manure.

It is a further feature of this invention to provide for a structure whereby installing and/or removing the paddle attachment can be easily accomplished.

It is a still further feature of this invention to keep the fine material pan of a manure spreader clean.

It is an object of this invention to overcome the aforementioned disadvantages of the prior art by providing a novel attachment for manure spreader paddles.

It is another object of this invention to provide the capability in a single paddle to efficiently discharge liquified material and still have the capability to shred and discharge tough pen-type manure.

It is still another object of this invention to provide a means to keep the paddle attachment from completely separating from the paddle during operation.

It is a further object of this invention to provide for a design which can be manufactured and utilized simply and inexpensively.

It is a still further object of this invention to provide a spreader paddle attachment which is durable of construction, inexpensive of manufacture, carefree of maintenance, facile in assemblage and effective in use.

These and other objects and features are accomplished according to the instant invention by providing a manure spreader paddle attachment wherein a flexible extension is attached to the trailing face of the manure spreader paddle. This extension covers the outer peripheral toothed edge of the paddle to provide a capability for the paddle to scoop up and discharge liquified material yet deflects when the paddle encounters tough pen-packed material to permit the teeth to engage, shred and discharge the more solidified material.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a plan view of the flexible paddle extension forming part of this invention;

FIG. 3 is a cross sectional view of the flexible paddle extension shown in FIG. 2 taken along line 3—3 looking in the direction of the arrows, this cross sectional view being shown in a natural, unconstrained state;

FIG. 4 is a plan view of the leading face of a manure spreader material engaging and distributing paddle equipped with a flexible extension in accordance with the principles of the present invention.

FIG. 5 is an end view of the paddle and attached extension shown in FIG. 4; and

FIG. 6 is a fragmentary cross sectional view of the rear discharge area and beater assembly of the manure spreader shown in FIG. 1 looking toward the right sidewall.

DETAILED DESCRIPTION OF THE INVENTION

Figure 1:
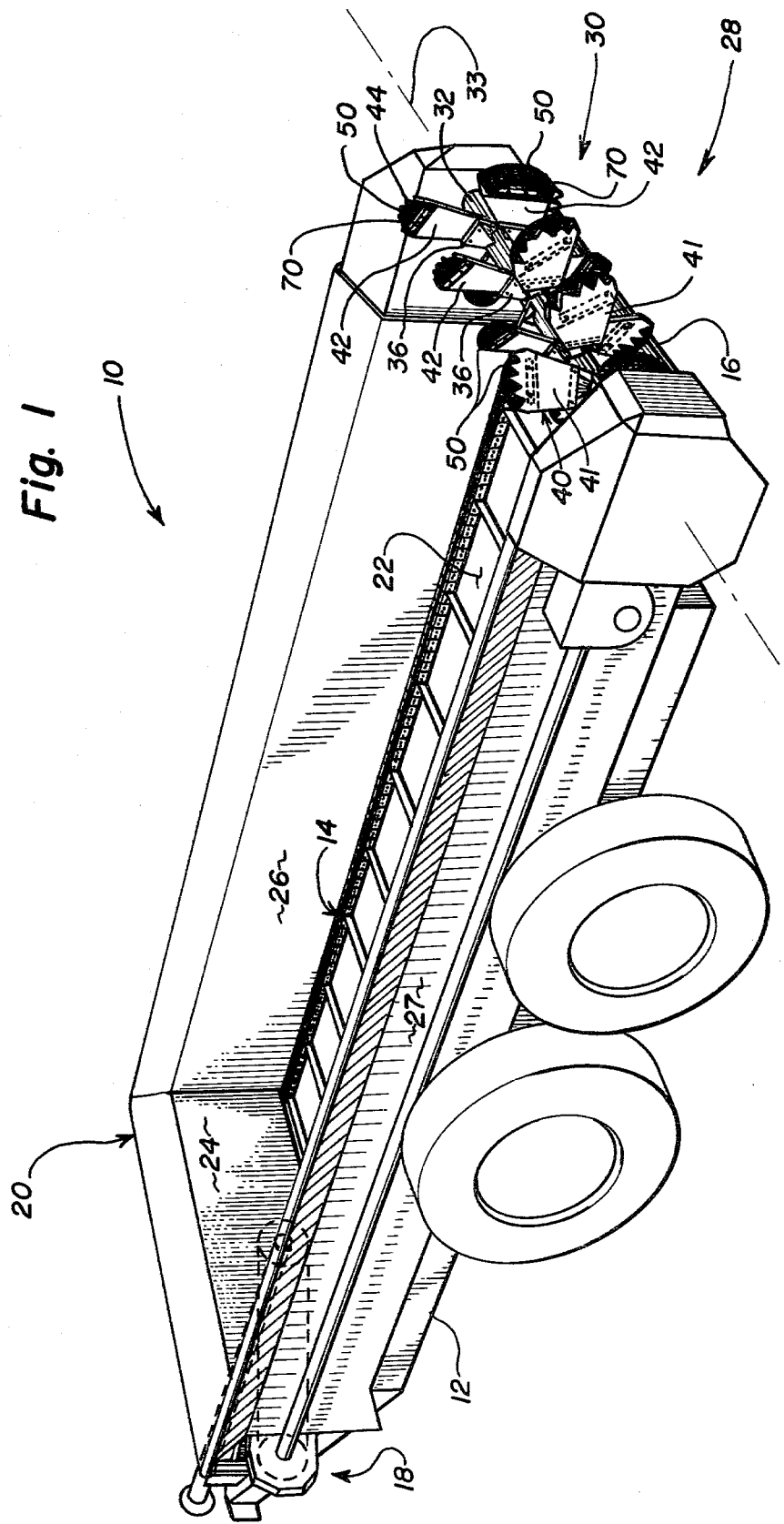
FIG. 1 is a perspective view of a manure spreader taken from the rear.

Referring now to the drawings and particularly to FIG. 1, a perspective view of a manure spreader can be seen. In the following description, right hand and left hand reference is determined by standing to the rear of the manure spreader and facing in the direction of travel. The manure spreader 10 is generally comprised of a mobile frame 12, a spreader box 20, a material conveying means 14, at least one beater assembly 30 and drive means 18 to provide motivational power to the material conveying means 14 and the beater assembly 30. Normally, when fine, semi-liquid or liquid material is being distributed by the manure spreader 10, a fine material pan, or "tines" pan, 16 is included as a component.

The spreader box 20 is usually of the open ended type and, as such, is composed of a floor 22, a front end wall 24, a right sidewall 26, a left sidewall 27 and an open rear discharge area 28. One or more beater assemblies 30 are rotatably journalled between the sidewalls 26, 27. Some models are equipped with as many as three beater assemblies such as the manure spreader shown in U.S. Pat. No. 4,026,476 issued to Ipnar et al. on May 31, 1977. As a matter of convenience, FIG. 1 displays a single beater assembly manure spreader. It should be realized by one skilled in the art that this invention is not limited by the number of beater assemblies disposed on the manure spreader.

As seen in perspective in FIG. 1 and in cross section in FIG. 6, a beater assembly 30 is usually comprised of a rotor shaft 32 with a longitudinal axis 33 rotatably secured between the right and left sidewalls 26, 27. Usually mounting brackets 36 are attached to the rotor shaft 32 at an oblique angle to the longitudinal axis 33. Material engaging and distributing paddles 40 are removably connected to the mounting brackets 36, such that upon rotation of the beater assembly, normally in the direction of arrow 38, the paddles 40 have a leading face 41 and a trailing face 42. The leading face 41 is the side of the paddle 40 which engages and distributes the material being transported by the manure spreader 10. The trailing face 42 is the opposing side of paddle 40.

As seen in plan in FIG. 4 and via the end view in FIG. 5, the material engaging and distributing paddle 40 is comprised of a base portion 47 adapted for connection to the mounting brackets 36, a main body portion 48 integrally formed with base portion 47 and a notched outer peripheral edge portion 43 integrally formed with the main body portion 48. The notches 45 in the outer peripheral edge portion 43 form teeth 44 which aggressively engage and shred the material to be distributed. In accordance with the principles of the present invention, the main body portion 48 of paddle 40 has at least two apertures 46 used for connecting the flexible extension 50 to the paddle 40.

As seen in FIG. 2 the flexible extension 50 is comprised of a body 52 which is defined by a base edge 55 and an arcuate outer peripheral edge 56. At least two slot shaped holes 58 extend through the body 52. Each slot shaped hole 58 corresponds to an aperture 46 in the main body portion 48 of paddle 40. The flexible extension 50 is attached to the trailing face 42 of paddle 40, as is seen best in FIG. 5. A bolt 61 interfits each hole 58 and corresponding aperture 46. The flexible extension 50 is secured to paddle 40 by means of a lock nut 62 which interengages with bolt 61.

A backup strip 70 is provided between lock nut 62 and the body 52 of flexible extension 50 so that the connecting means 60 will not pull through the slot shaped holes 58. The backup strip 70 has at least two openings 71 therethrough which correspond to the slot shaped holes 58 and apertures 46. The size and shape of the backup strip is not critical so long as each is sufficient to interconnect and encompass the openings 71. As shown in FIG. 4 and FIG. 5, the backup strip 70 can have a rectangular shape 72 with length dimension 73 and width dimension 74 substantially smaller than those of either paddle 40 or flexible extension 50.

It should be realized by one skilled in the art that the connecting means 60 as shown in FIG. 5 is not limited to a bolt 61 and lock nut 62. Other variations which come to mind include riveting or bonding the flexible extension 50 to paddle 40. By providing a connecting means 60 comprised of a bolt 61 and lock nut 62 and by providing slot shaped holes 58, the connecting means may be loosened as desired and the flexible extension 50 adjusted with respect to the notched outer peripheral edge 43 to compensate for wear.

As best seen in FIG. 3, the preferred embodiment of this invention reveals a cross section of paddle extension body 52 as having a curved shape. This curve 54 improves the rigidity of flexible extension 50. The curve 54 extends from the base edge 55 toward the outer peripheral edge 56. The concave surface 57 of the cross section is mounted facing the trailing face 42 of paddle 40. As seen in FIG. 5, a tightening by the connecting means 60 straightens the curved cross section such that the body portion 52 conforms to and is substantially parallel to the main body portion 48 of paddle 40. It should further be realized by one skilled in the art that the curve 54 enables a thinner, generally more flexible paddle extension to have greater rigidity, thereby reducing costs; however, the instant invention is not limited to a paddle extension having a curved cross section.

FIG. 6 reveals the interaction between the flexible extension 50 and fine material pan 16 by means of a cross sectional view of the rear discharge area 28 of manure spreader 10. The particular mounting of the fine material pan 16 is not a part of this invention. An example of how a fine material pan could be mounted on a manure spreader can be seen in U.S. Pat. No. 3,298,695 granted to Brackbill on Jan. 17, 1967. The positional relationship between beater assembly 30 and fine material pan 16 is such that upon rotation of the rotor shaft 32 the flexible extension 50 when mounted on paddle 40 sweepingly engages the concave top surface 17 of the fine material pan 16. Upon a full revolution of the beater assembly 30 each respective paddle 40 sweeps across the concave top surface 17 such that the entire length of the fine material pan 16 is swept clean.

The function of flexible extension 50 is to provide a structure which efficiently scoops up and discharges semi-liquid or liquid material. Without the benefit of flexible extension 50, the standard tooth paddle 40 merely combs through such material. It has been found that the standard tooth paddle 40 will discharge sloppy material given sufficient time; however, this is not an efficient way to accomplish this task. The aggressive tooth-type paddle is needed to engage and shred tough pen-packed material. A blunt paddle with no teeth would unload sloppy material but would not shred the tough pen-packed material without requiring excessive amounts of power. By attaching flexible extension 50 to the trailing face 42 of paddle 40, a blunt type paddle has effectively been created which efficiently discharges sloppy material. However, when tough pen-packed material approaches the beater assembly 30 and the paddles 40 begin to engage such material, the flexible extension 50 deflects away from the trailing face 42 to allow the teeth 44 to engage and shred.

It has been found that constructing the flexible extension 50 from a section of tire carcass with six ply thickness (about ⅜ inch) produces the desirable curved shape and the requisite flexible qualities once mounted to the trailing face 42 of paddle 40. Using this construction for the flexible extension 50 results in a location of the connecting means 60 within a range of 3⅞ inches to 5⅜ inches from the outer peripheral edge 56. It has also been found that using two ½ inch bolts and lock nuts for the connecting means 60 and correspondingly sized holes, apertures and openings spaced laterally, satisfactorily maintains stability and the positional relationship between the flexible extension 50 and paddle 40. It should be realized that the exact location of the connecting means relative to the outer peripheral edge of the paddle extension is a function of the rigidity of the body of the paddle extension which in turn is dependent upon the thickness and type of material being used.

The size of the backup strips 70 should be kept as small as possible and still be functional. By providing a relatively large backup strip, the deflecting capability of the flexible extension 50 is diminished. In the case of the specific arrangement noted above, it has been found that a 1½ inch×7⅜ inch rectangular backup strip constructed from 12 gauge steel was sufficient. It should be realized also that the invention is not limited by the given choice of materials. Other choices of materials may be used so long as the aforementioned functions are performed. It should be further realized that the particular arrangement and disposition of component parts of the manure spreader 10 (particularly as depicted in the preferred embodiment in FIG. 1 and in FIG. 6) does not limit the invention.

Generally the shape and size of the flexible extension 50 is dependent upon the size and shape of the paddle 40. The size and shape of extension 50 can be modified to fit any variety of paddle including, for example, the cupped shaped paddle disclosed in U.S. Pat. No. 4,069,982 granted to Brackbill on Jan. 24, 1978. The radius of curvature for the arcuate outer peripheral edge 56 could equal the radius of curvature of the concave top surface 17 of the fine material pan 16 which is usually identical to the radius of curvature defined by the outside diameter of the rotation of the beater assembly.

It will be understood that various changes in the details, materials, steps and arrangements of parts which have been described and illustrated in order to explain the nature of the invention will occur to and may be made by those skilled in the art upon a reading of the disclosure within the principles and the scope of the invention.

Having thus described the invention, what is claimed is:

1. In a manure spreader having a mobile frame adapted for movement across a field; an opened ended spreader box mounted on said frame, said spreader box having a floor, a front end wall, two laterally spaced sidewalls and an open rear discharge area; a material conveying means for transporting material rearwardly within said spreader box toward said rear discharge area; at least one beater assembly rotatably journalled between said sidewalls within said rear discharge area, said beater assembly having a rotor shaft and a plurality of material engaging and distributing paddles mounted on said rotor shaft, said paddles being mounted angularly on said rotor shaft such that each of said paddles has a leading face and a trailing face, each of said paddles further having an arcuate notched outer peripheral edge, said notches forming teeth to engage and shred material being transported towards said rear discharge area by said material conveying means; and drive means connected to each said beater assembly and material conveying means for providing movement thereof, the improvement wherein at least one said paddle comprises:
   a flexible paddle extension attached to said trailing face of said at least one paddle, said paddle extension having a main body portion defined by a base edge and a remote arcuate peripheral edge substantially parallel to said notched peripheral edge of said at least one paddle, whereby said paddle extension provides a structure for efficient engagement of semi-liquid and liquid material while maintaining the capability to deflect when said paddle engages more solidified material, thereby allowing said teeth to engage and shred said material.

2. The manure spreader of claim 1 wherein said manure spreader further has an arcuate fine material pan extending transversely between said sidewalls adjacent to said floor within said rear discharge area, said fine material pan having a generally concave top surface substantially parallel to said rotor shaft, said fine material pan being positioned respective to said beater assembly such that said paddle extension sweepingly engages said concave top surface.

3. The manure spreader of claim 2 wherein said main body portion of said paddle extension has at least two slot-shaped holes therethrough, said slot-shaped holes being aligned substantially perpendicular to said base edge, said paddle having at least two apertures therethrough, one said aperture corresponding to each said slot-shaped hole, said paddle extension further having a connecting means interfitting each said slot-shaped hole and corresponding aperture for detachably affixing said paddle extension to said trailing face of said at least one paddle, whereby said slot-shaped holes allow positional adjustment of said paddle extension relative to said notched peripheral edge of said at least one paddle.

4. The manure spreader of claim 3 wherein said peripheral edge of said paddle extension is substantially coextensive with said notched peripheral edge of said at least one paddle and said peripheral edge of said paddle extension is radially more distant from said rotor shaft than said notched peripheral edge of said at least one paddle.

5. The manure spreader of claim 4 wherein said paddle extension includes a rigid backup strip, said backup strip having at least two openings therethrough, one said opening corresponding to each said aperture, said backup strip having a shape and length and width dimensions sufficient to interconnect and encompass said openings, said width dimension being greater than the diameter of said opening, said backup strip being substantially smaller than said main body portion, said backup strip interengaging with each said connecting means to assist in maintaining the positional relationship between said paddle and said paddle extension, said backup strip further being positioned such that said paddle extension is situated between said backup strip and said trailing face of said paddle.

6. The manure spreader of claim 5 wherein said backup strip is removable from said main body portion.

7. The manure spreader of claim 5 wherein the unconstrained cross section of said main body portion is curved from said base portion to said peripheral edge inwardly toward said trailing face of said paddle.

8. The manure spreader of claim 7 wherein each said paddle coming in close proximity to said concave top surface of said fine material pan during the rotation of said beater assembly has a paddle extension attached to said trailing face.

9. The manure spreader of claim 8 wherein said flexible paddle extension is constructed from a section of tire carcass.

10. The manure spreader of claim 9 wherein each said connecting means includes one bolt and lock nut.

11. The manure spreader of claim 10 wherein said backup strip is constructed of steel.

12. A manure spreader comprising:
   a mobile frame adapted for movement across a field;
   a spreader box mounted on said frame, said spreader box having a floor, a front end wall, a left sidewall, a right sidewall laterally spaced from said left sidewall, and a rear discharge area;
   a material conveying means for transporting material rearwardly within said spreader box toward said rear discharge area;
   a beater assembly rotatably supported on said frame above said floor adjacent said rear discharge area, said beater assembly having a rotor shaft rotatably secured about a longitudinal axis;
   a plurality of material engaging and distributing paddles mounted on said rotor shaft at an angle to said longitudinal axis and forming a part of said beater assembly, each said paddle having a leading face for striking the material to be discharged upon rotation of said beater assembly and a trailing face oppossed to said leading face, each said paddle further having an arcuate notched outer peripheral edge, said notches forming teeth which engage and shred material being transported towards said discharge area;
   a flexible paddle extension attached respectively to each said trailing face, said paddle extension having a body portion defined by a base edge and a remote arcuate peripheral edge substantially coextensive with said notched outer peripheral edge, said body portion being attached substantially parallel to said trailing face; and
   drive means connected to each said beater assembly and material conveying means to provide motivational power thereto.

13. The manure spreader of claim 12 further comprising:
   a fine material pan extending transversely between said left sidewall and said right sidewall, adjacent to said floor and within said rear discharge area, said beater assembly being positioned such that each said paddle extension thereon sweepingly engages said fine material pan.

14. The manure spreader of claim 13 wherein said fine material pan has a concave top surface so situated that each said paddle extension on said beater assembly sweepingly engages said concave top surface, said concave top surface extending substantially longitudinally between said left sidewall and said right sidewall.

15. The manure spreader of claim 14 wherein said peripheral edge of said paddle extension projects radially from said rotor shaft beyond said notched peripheral edge of said paddle.

16. The manure spreader of claim 14 wherein said body portion has at least two slot shaped holes therethrough aligned substantially perpendicular to said base, said paddle having at least two apertures therethrough, one said aperture corresponding to each said hole, said paddle extension having a connecting means interfitting each said hole and corresponding aperture for detachably connecting said paddle extension to said trailing face of said paddle, whereby said slot shaped holes allow for positional adjustment of said paddle extension relative to said notched peripheral edge of said paddle.

17. The manure spreader of claim 16 wherein said paddle extension includes a removable rigid backup strip, said backup strip being located opposite said trailing face, said backup strip having at least two openings therethrough, one said opening corresponding to each said hole, said backup strip further having a shape and length and width dimensions sufficient to interconnect and encompass said opening, said backup strip being smaller than said body portion, said backup strip interengaging with each said connecting means to maintain the desired positional relationship between said paddle and said paddle extension.

18. The manure spreader of claim 17 wherein the unconstrained cross section of said body portion is curved from said base edge to said peripheral edge inwardly towards said trailing face.

19. The manure spreader of claim 18 wherein said flexible paddle extension is constructed from a section of tire carcass.

20. The manure spreader of claim 19 wherein each said connecting means includes one bolt and lock nut.

21. The manure spreader of claim 20 wherein said backup strip is constructed of steel.

22. A manure spreader material engaging and distributing paddle comprising:
   a base portion for detachably mounting said paddle to a manure spreader;
   a main body portion integrally formed with said base portion;
   an arcuate notched outer peripheral edge portion integrally formed with said main body portion, said notches forming teeth to engage and shred the material to be distributed;
   a leading face superimposed over said base portion, said main body portion and said outer peripheral edge portion for striking, engaging and distributing said material;
   a trailing face opposed to said leading face; and
   a flexible extension attached to said trailing face, said extension having a body defined by a base edge and a remote arcuate peripheral edge substantially parallel to and at least partially coextensive with said notched outer peripheral edge portion, said body being attached to said trailing face adjacent said base edge, whereby said extension provides a structure for engagement of semi-liquid and liquid material while maintaining a capability to deflect when engaging more solidified material, thereby allowing said teeth to engage and shred said material.

23. The paddle of claim 22 wherein said peripheral edge of said extension is substantially co-extensive with said notched outer peripheral edge portion.

24. The paddle of claim 23 wherein said base edge of said extension has at least two slot shaped holes therethrough, said slot shaped holes being aligned substantially perpendicular to said base edge, said main body portion having at least two apertures therethrough, one said aperture corresponding to each said slot shaped hole, said paddle further comprising a connecting means interfitting each said slot shaped hole and corresponding aperture for detachably affixing said extension to said trailing face, whereby said slot shaped holes allow positional adjustment of said extension relative to said notched outer peripheral edge portion to compensate for wear.

25. The paddle of claim 24 further comprising a detachable rigid backup strip opposite of said extension base edge from said trailing face, said backup strip having at least two openings therethrough, one said opening corresponding to each said hole, said backup strip having a size and shape sufficient to interconnect and encompass said openings, said backup strip being smaller than said extension body, said backup strip interengaging with each said connecting means to aid in maintaining the positional relationship between said extension and said trailing face.

* * * * *